US006180731B1

(12) United States Patent
Rohde et al.

(10) Patent No.: US 6,180,731 B1
(45) Date of Patent: *Jan. 30, 2001

(54) POLYMERISATES OF ETHYLENE WITH A HIGH DEGREE OF RESISTANCE TO STRESS CRACK, AND A CATALYST SYSTEM FOR THE PRODUCTION THEREOF

(75) Inventors: Wolfgang Rohde, Speyer; Roland Saive, Ludwigshafen; Dieter Lilge, Limburgerhof; Martin Lux, Dannstadt-Schauernheim; Peter Bauer, Ludwigshafen, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/000,011

(22) PCT Filed: Aug. 7, 1996

(86) PCT No.: PCT/EP96/03492

§ 371 Date: Jan. 22, 1998

§ 102(e) Date: Jan. 22, 1998

(87) PCT Pub. No.: WO97/08213

PCT Pub. Date: Mar. 6, 1997

(30) Foreign Application Priority Data

Aug. 22, 1995 (DE) .............................................. 195 30 766

(51) Int. Cl.[7] ...................................................... C08F 4/42

(52) U.S. Cl. ......................... 526/113; 526/114; 526/115; 526/118; 526/119; 526/160; 526/129; 526/348.1; 526/352; 526/943; 502/152; 502/153; 502/232; 502/254

(58) Field of Search .................................... 526/114, 113, 526/115, 118, 119, 160, 352, 348.1, 943, 129; 502/152, 153, 232, 254

(56) References Cited

U.S. PATENT DOCUMENTS

| 4,284,527 | 8/1981 | Pullukat et al. |
|---|---|---|
| 5,527,867 | * 6/1996 | Bergmeoster et al. ............... 526/119 |
| 5,648,439 | * 7/1997 | Bergmeister et al. ................ 529/96 |

FOREIGN PATENT DOCUMENTS

| 544 693 | 8/1982 | (AU) . |
|---|---|---|
| 25 40 279 | 3/1977 | (DE) . |
| 90 374 | 10/1983 | (EP) . |

(List continued on next page.)

Primary Examiner—David W. Wu
Assistant Examiner—Ling-Siu Choi
(74) Attorney, Agent, or Firm—Keil & Weinkauf

(57) ABSTRACT

Polymers of ethylene are obtainable by polymerization of ethylene and, if desired, further comonomers in the presence of a catalyst system comprising as active constituents I) a Phillips catalyst, II) a solid which is different from I) and comprises a component which is derived from the metallocene complexes of the formula (A) in which the substituents and indices have the following meanings:

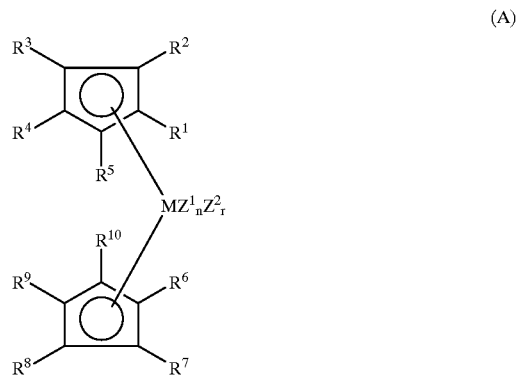

(A)

$R^1$ to $R^{10}$ are hydrogen, $C_1$–$C_{10}$-alkyl, 5-to 7-membered cycloalkyl which may in turn bear $C_1$–$C_6$-alkyl groups as substituents, $C_6$–$C_{15}$-aryl or aryalkyl, where two adjacent radicals may also together form a cyclic group having from 4 to 15 carbon atoms, or $Si(R^{11})_3$, where $R^{11}$ is $C_1$–$C_{10}$-alkyl, $C_6$–$C_{15}$-aryl or $C_3$–$C_{10}$-cycloalkyl, or the radicals $R^4$ and $R^9$ together form a group $-[Y(R^{12}R^{13})]_m-$, where Y is silicon, germanium, tin or carbon, and $R^{12}$, $R^{13}$ are hydrogen $C_1$–$C_{10}$-alky, $C_3$–$C_{10}$-cycloalyl or $C_6$–$C_{15}$-aryl, M is a metal of transition groups IV to VIII or a metal of the lanthanide series, $Z^1$, $Z^2$ are fluorine, chlorine, bromine, iodine, hydrogen, $C_1$–$C_{20}$-alkyl or aryl, $-OR^{14}$, $-OOCR^{14}$,

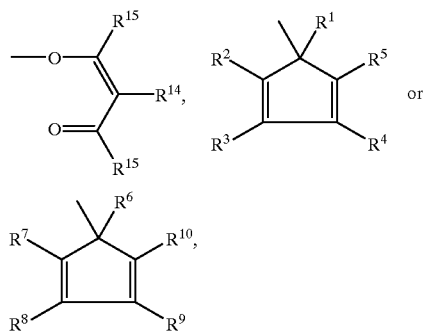

where $R^{14}$ is hydrogen or $C_1$–$C_{20}$-alkyl; $R^{15}$ is $C_1$–$C_{20}$-alkyl; m is 1,2,3 or 4; n is 0, or 2; r is 0, 1 or 2; the sum n+r is likewise 0, 1 or 2, and, if desired, III) an organometallic component selected from groups IA, IIA, IIB and IIIA of the Periodic Table of the Elements.

10 Claims, No Drawings

FOREIGN PATENT DOCUMENTS

| | | |
|---|---|---|
| 166 157 | 1/1986 | (EP) . |
| 284 708 | 10/1988 | (EP) . |
| 339 571 | 11/1989 | (EP) . |
| 339571 * | 11/1989 | (EP) . |
| 533 156 | 3/1993 | (EP) . |
| 92/17511 | 10/1992 | (WO) . |
| 96/21684 | 7/1996 | (WO) . |

* cited by examiner

POLYMERISATES OF ETHYLENE WITH A HIGH DEGREE OF RESISTANCE TO STRESS CRACK, AND A CATALYST SYSTEM FOR THE PRODUCTION THEREOF

The present invention relates to polymers of ethylene obtainable by polymerization of ethylene and, if desired, further comonomers in the presence of a catalyst system comprising as active constituents I) a Phillips catalyst, II) a solid which is different from I) and comprises a component which is derived from the metallocene complexes of the formula (A) in which the substituents and indices have the following meanings:

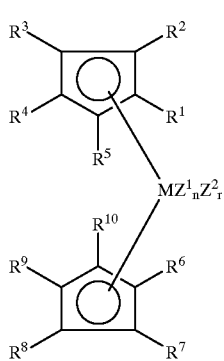

(A)

$R^1$ to $R^{10}$ are hydrogen, $C_1$–$C_{10}$-alkyl, 5- to 7-membered cycloalkyl which may in turn bear $C_1$–$C_6$-alkyl groups as substituents, $C_6$–$C_{15}$-aryl or arylalkyl, where two adjacent radicals may also together form a cyclic group having from 4 to 15 carbon atoms, or $Si(R^{11})_3$, where $R^{11}$ is $C_1$–$C_{10}$-alkyl, $C_6$–$C_{15}$-aryl or $C_3$–$C_{10}$-cycloalkyl, or the radicals $R^4$ and $R^9$ together form a group $—[Y(R^{12}R^{13})]_m—$, where Y is silicon, germanium, tin or carbon, $R^{12}$, $R^{13}$ are hydrogen, $C_1$–$C_{10}$-alkyl, $C_3$–$C_{10}$-cycloalkyl or $C_6$–$Cl_5$-aryl M is a metal of transition groups IV to VIII or a metal of the lanthanide series, $Z^1$, $Z^2$ are fluorine, chlorine, bromine, iodine, hydrogen, $C_1$–$C_{20}$-alkyl or aryl, $—OR^{14}$, $—OOCR^{14}$,

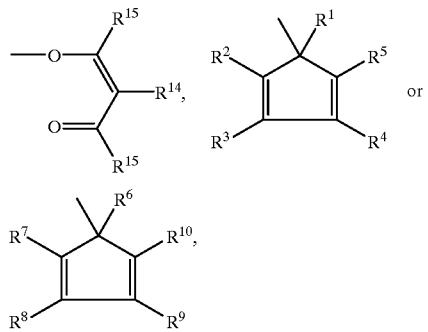

where $R^{14}$ is hydrogen or $C_1$–$C_{20}$-alkyl,
$R^{15}$ is $C_1$–$C_{20}$-alkyl,
m 1, 2, 3 or 4
n 0, 1 or 2
r 0, 1 or 2,
where the sum n+r is likewise 0, 1 or 2,
and, if desired, III) an organometallic component selected from groups IA, IIA, IIB and IIIA of the Periodic Table of the Elements.

The invention further relates to catalyst systems which are suitable for the polymerization of ethylene and, if desired, further comonomers, a process for preparing the polymers of ethylene and the use of the polymers of ethylene for producing films, moldings and fibers and also the films, moldings and fibers.

Moldings and films are frequently produced from polyethylene. Polyethylene moldings are used, for example, as plastic fuel containers (tanks), containers for the transport of dangerous goods or as pressure pipes for gas and water. In these applications, the moldings should not rupture under stress, or in other words their environmental stress crack resistance should be as high as possible. In addition, the moldings should display little deformation under the action of external force, which means that their stiffness should be as great as possible.

Ethylene polymers whose processing leads to moldings having a relatively high environmental stress crack resistance and a relatively high stiffness can, as described in EP-A 0 533 155 and EP-A 0 533 156, be obtained by mixing ethylene polymers which have been prepared, on the one hand, using Ziegler catalysts and, on the other hand, using Phillips catalysts. However, this process is complicated because each polymer component has to be prepared on its own using different catalysts in separate reactors and the components have to be mixed in a separate step.

WO-A 92/17511 describes the polymerization of ethylene in the presence of two Phillips catalysts which differ in their pore volume. However, the properties of the polymers obtained here leave something to be desired. This applies particularly to the relationship of stiffness and environmental stress crack resistance of the moldings produced from them.

It is an object of the present invention to provide novel ethylene polymers which do not have the stated disadvantages, or have them to only a small degree, and which are suitable for producing moldings having a good environmental stress crack resistance and a high stiffness.

We have found that this object is achieved by the ethylene polymers and catalyst systems defined at the outset. In addition, we have found a process for preparing the ethylene polymers and also the use of the ethylene polymers for producing films, moldings and fibers and also the films, moldings and fibers.

The ethylene polymers of the present invention usually have a 35 density, measured in accordance with DIN 53479, in the range from 0.925 to 0.965 g/cm³, preferably in the range from 0.945 to 0.955 g/cm³, and a melt flow rate (MFR), measured in accordance with DIN 53735 under different loads (in brackets), in the range from 0.0 (190° C./21.6 kg) to 200 (190° C./2.16 kg) g/10 min, preferably in the range from 2.0 (190° C./21.6 kg) to 50 (190° C./21.6 kg) g/10 min.

The weight average molecular weight Mw is generally in the range from 10,000 to 7,000,000, preferably in the range from 20,000 to 1,000,000. The molecular weight distribution Mw/Mn, measured by GPC (gel permeation chromatography) at 135° C. in 1,2,4-trichlorobenzene relative to a polyethylene standard, is usually in the range from 3 to 300, preferably in the range from 8 to 30.

In general, the ethylene polymers produced in the reactor are melted and homogenized in an extruder. The melt flow rate and the density of the extrudate can then differ from the corresponding values for the raw polymer, but remain in the range according to the present invention.

The catalyst systems of the present invention comprise a mixture of the solid components I) and II) of different types which can be prepared separately and, if desired, organometallic compounds III) of the first (IA), second (IIA) and third (IIIA) main group or the second (IIB) transition group of the Periodic Table of the Elements, which generally function as activators. It is also possible to use mixtures of the organometallic compounds III).

To prepare the solid components I) and II), a support material is generally brought into contact with one or more compound(s) containing the appropriate transition metal.

The support material is usually a porous inorganic solid which may still contain hydroxy groups. Examples of such solids, which are known to those skilled in the art, are aluminum oxide, silicon dioxide (silica gel), titanium dioxide or their mixed oxides, or aluminum phosphate. Further suitable support materials can be obtained by modifying the pore surface with compounds of the elements boron (BE-A-61,275), aluminum (U.S. Pat. No. 4,284,5,27), silicon (EP-A 0 166 157), phosphorus (DE-A 36 35 715) or titanium. The support material can be treated under oxidizing or nonoxidizing conditions at from 200 to 1000° C., in the presence or absence of fluorinating agents such as ammonium hexafluorosilicate.

The polymerization-active component of type I) is a customary Phillips catalyst known to those skilled in the art whose preparation is described, for example, in DE-A 25 40 279 or DE-A 39 38 723. Described in a simplified way, it is generally obtained by impregnating a support material, for example silica gel, with a chromium-containing solution, evaporating the solvent and heating the solid under oxidizing conditions, for example in an oxygen-containing atmosphere, at from 400 to 1000° C. This activation can be followed by a reduction which can, for example, be carried out by treating the chromium-containing solid with carbon monoxide at from 20 to 800° C. The preparation process for I) thus generally comprises at least one oxidizing step.

The polymerization-active component II) of the catalyst systems of the present invention differs from the component I) in that, inter alia, an organometallic compound of a transition metal is generally applied to a support material in the preparation of II) and the subsequent treatment of the solid under oxidizing conditions is omitted. The support material can be calcined at from 50 to 1000° C. before treatment with the organometallic transition metal compound. It is also possible for organometallic compounds III), preferably aluminum alkyls having from 1 to 10 carbon atoms, in particular trimethylaluminum, triethylaluminum or aluminoxanes, to be applied to the support materials.

To prepare the component II), a metal complex of the formula (A) is generally dissolved in a solvent, for example an aliphatic or aromatic hydrocarbon or an ether, and mixed with the support material. Preference is given to using hexane, heptane, toluene, ethylbenzene, tetrahydrofuran or diethyl ether as solvent and silica gel, aluminum oxide or aluminum phosphate as support material.

The solvent is removed from the resulting suspension, usually by evaporation.

It is also possible to mix the metal complex (A) with one or more organometallic compounds of the component (III), in particular $C_1$–$C_4$-trialkylaluminums, eg. trimethyl aluminum or triethylaluminum, or with methylaluminoxane, before contact with the support material and then to bring the mixture into contact with the support material.

Furthermore, suitable complexes (A) can be deposited from the gas phase onto the support material by sublimation. For this purpose, the complexes (A) are generally mixed with the support material, for example silica gel, aluminum oxide or aluminum phosphate, and heated to from 0 to 200° C. at a pressure in the range from 0.00001 to 100 kPa. In this process, preference is given to using chromium-containing complexes (A) and, in particular, unsubstituted or substituted bis(cyclopentadienyl)chromium compounds.

The transition metal content of the component II) is generally in the range from 1 to 1000 $\mu$mol of transition metal/g of solid, preferably in the range from 10 to 500 $\mu$mol of transition metal/g of solid.

In the metal complex (A)

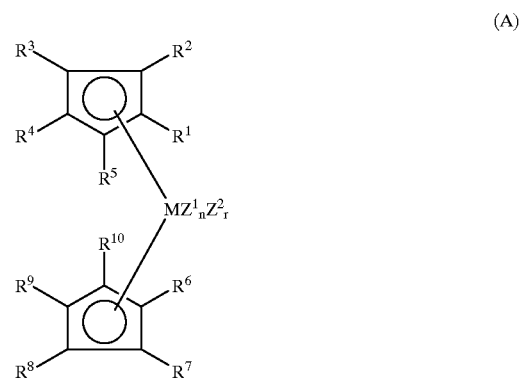

(A)

M is a metal of the 4th to 8th transition groups (IVB to VIIIB) or of the lanthanide series of the Periodic Table of the Elements, preferably titanium, zirconium, hafnium, vanadium, niobium, tantalum, chromium, molybdenum, tungsten, manganese, iron, ruthenium, osmium, cobalt or nickel and very particularly preferably titanium, zirconium, hafnium or chromium.

$R^1$ to $R^{10}$ are hydrogen, $C_1$–$C_{10}$-alkyl, 5- to 7-membered cycloalkyl which may in turn bear $C_1$–$C_6$-alkyl groups as substituents, $C_6$–$C_{15}$-aryl or arylalkyl, where two adjacent radicals may also together form a cyclic group having from 4 to 15 carbon atoms (ring fusion), or $Si(R^{11})_3$, where $R^{11}$ is $C_1$–$C_{10}$-alkyl, $C_6$–$C_{15}$-aryl or $C_3$–$C_{10}$-cycloalkyl or the radicals $R^4$ and $R^9$ together form a group —$[Y(R^{12}R^{13})]_m$—, where Y is silicon, germanium, tin or carbon, $R^{12}$, $R^{13}$ are hydrogen, $C_1$–$C_{10}$-alkyl, $C_3$–$C_{10}$-cycloalkyl or $C_6$–$C_{15}$-aryl.

$R^1$ to $R^{10}$ are preferably hydrogen, methyl, ethyl, n-propyl, iso-propyl, n-butyl, tert-butyl, a fused-on 6- or 7-membered carbocyclic ring system and/or a bridge —$[Y(R^{12}R^{13})]_m$—. In particular, $R^1$ to $R^{10}$ are hydrogen, methyl, n-butyl or a fused-on 6-membered ring system (indenyl-type ligand) and/or a bridge —$[Y(R^{12}R^{13})]_m$—. Preferred bridges —$[Y(R^{12}R^{13})]_m$— are those where Y is carbon or silicon; $R^{12}$, $R^{13}$ are then hydrogen, methyl, ethyl, n-propyl, iso-propyl, n-butyl, tert-butyl or phenyl and m is preferably 1 or 2.

$Z^1$, $Z^2$ in (A) are fluorine, chlorine, bromine, iodine, hydrogen, $C_1$–$C_{20}$-alkyl or aryl, preferably $C_1$–$C_{20}$-aliphatic radicals, $C_3$–$C_{10}$-cycloaliphatic radicals, $C_6$–$C_{15}$-aromatic radicals or aralkyl radicals having from 6 to 15 carbon atoms in the aryl radical and from 1 to 10 carbon atoms in the alkyl radical. Examples which may be mentioned are methyl, ethyl, n-propyl, i-propyl, n-butyl, sec-butyl, tert-butyl, isobutyl, cyclopentyl, cyclohexyl, phenyl, tolyl and benzyl.

$Z^1$, $Z^2$ may also be alkoxide (—$OR^{14}$), carboxylate (—$OOCR^{14}$), aldolate

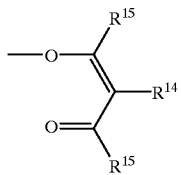

or derivatives of the cyclopentadienyl radical

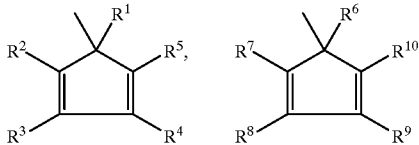

where $R^1$ to $R^{10}$ are as defined above.

$R^{14}$, $R^{15}$ are hydrogen, $C_1$–$C_{20}$-alkyl, preferably methyl, ethyl, iso-propyl or tert-butyl.

$Z^1$, $Z^2$ in (A) are preferably hydrogen, chlorine, methyl or phenyl, in particular chlorine.

The index m in (A) is 1, 2, 3 or 4, preferably 1 or 2 and in particular 1. A very preferred bridge is the dimethylsilyl group.

The indices n and r in (A) are 0, 1 or 2, where the sum n+r is likewise 0, 1 or 2. Preferably, n and r are 0, 1 or 2 and the sum n+r is preferably 0 or 2.

Well suited compounds of the formula (A) are complexes containing unsubstituted or substituted bis(cyclopentadienyl) or bis(indenyl) ligands, and also complexes containing bridged substituted or unsubstituted indenyl ligands, as are described, for example, in DE-C 43 44 672.

Examples of preferred metallocene complexes of the formula (A) are dimethylsilylbis(2-methylbenzindenyl)zirconium dichloride, bis(cyclopentadienyl)zirconium dichloride, bis-(pentamethylcyclopentadienyl)zirconium dichloride, bis(n-butylcyclopentadienyl)zirconium dichloride, bis(cyclopentadienyl)chromium, bis(pentamethylcyclopentadienyl)chromium, bis(indenyl)chromium and bis(fluorenyl)chromium.

In particular, compounds (A) used are dimethylsilylbis(2-methylbenzindenyl)zirconium dichloride, bis(pentamethylcyclopentadienyl)zirconium dichloride or bis(cyclopentadienyl)chromium.

The catalyst components I) and II) can generally be selected freely, but preference is given to catalyst systems whose individual components I) and II) differ in their copolymerization behavior toward a monomer mixture of ethylene/comonomer.

The copolymerization behavior can be described by the equation $$R=(b-1)/a$$

where b is the molar ratio of the derived structural units (ethylene:comonomer) in the copolymer and a is the molar ratio of ethylene to comonomer in the monomer mixture in the reactor.

Well suited combinations I) and II) are generally those whose R values of the individual components differ by a factor of 2 or more, in particular those whose R values differ by a factor of 4 or more.

The polymers of the present invention can be obtained by homopolymerization of ethylene or by copolymerization of ethylene with one or more other monomers in the presence of the catalyst components I), II) and, if desired, III).

Useful comonomers are usually $C_3$–$C_{15}$-alk-1-enes, for example propene, 1-butene, 1-pentene, 1-hexene, 4-methyl-1-pentene, 1-octene, 1-decene, 1-dodecene or 1-pentadecene. Preference is given to using 1-butene, 1-hexene or 1-octene and in particular 1-hexene.

The chemically bound proportion of comonomer in the copolymers is generally in the range from 0.1 to 2 mol %, preferably from 0.3 to 1.5 mol %, based on the copolymer.

The polymerizations can be carried out by the known methods customary for the polymerization of olefins, for example solution processes, suspension processes, stirred gas phase or gas-phase fluidized-bed processes, continuously or batchwise. Solvents or suspension media which can be used are inert hydrocarbons such as iso-butane or else the monomers themselves.

The pressure is generally from 100 to 10,000 kPa, preferably from 1000 to 6000 kPa and the temperature is generally in the range from 10 to 150° C., preferably in the range from 30 to 125° C.

Particularly well suited processes for preparing the polymers of the present invention are the suspension process and the gas-phase fluidized-bed process. The particular catalyst composition makes it possible to obtain the polymers of the present invention from a single reactor.

The catalyst components I) and II) can be mixed before they come into contact with the monomers and then metered jointly into the reactor or they can be metered into the reactor separately from one another, for example at a plurality of points.

The polymerization can advantageously be carried out in the presence of an organometallic component III) selected from groups IA, IIA, IIB and IIIA of the Periodic Table of the Elements. Suitable compounds III) are, for example, lithium, boron, zinc or aluminum $C_1$–$C_{10}$-alkyls or alkyl hydrides, or else $C_1$–$C_4$-alkylaluminoxanes, which are described, for example, in EP-A 284 708. Very well suited compounds of this type are, for example, n-butyllithium, triethylboron, tris(pentafluorophenyl)boron, triethylaluminum, trihexylaluminum, diisobutylaluminum hydride and methylaluminoxane. If bis(cyclopentadienyl)chromium or one of its substituted cyclopentadienyl derivatives is used as component II), n-butyllithium is particularly useful as component III).

The molar ratio of organometallic component III) to transition metal is generally from 1000:1 bis 0.01:1, preferably from 500:1 to 1:1.

As molar mass regulator, use is generally made of hydrogen, preferably when using components II) which contain metals of group IVB or VIB, eg. zirconium or chromium. In the absence of hydrogen, the molar mass of the polymers can be influenced by varying the reaction temperature.

The polymers of the present invention have a high environmental stress crack resistance at the same time as a high stiffness (density). They are well suited to producing components which have to have a high environmental stress crack resistance and a high stiffness, in particular pressure pipes for gas or water. Furthermore, they can be advantageously used for coating pipes and for producing cable sheathing.

EXAMPLES

Catalyst Preparation

Example 1

Component I 116.5 g of chromium trinitrate nonahydrate (0.29 mol) and 37.5 g of diammonium hexafluorosilicate (0.21 mol)

were added to a suspension of 1.5 kg of a silica gel (SD 32 16 from Grace) in 8 l of water and the mixture was stirred for 1 hour at 25° C. The water was subsequently removed at 100° C. under reduced pressure and the solid was treated at 550° C. in a stream of air for two hours.

Component IIa) (chromium-containing)
General Procedure

Silica gel (SG 332 from Grace) was calcined at 800° C. in a stream of argon for six hours and was then brought into contact with bis(cyclopentadienyl)chromium (chromocene) in three different variants A to C (see below).
Variant A 4 g (0.02 mol) of bis(cyclopentadienyl)chromium were added to a suspension of 60 g of calcined silica gel in 500 ml of heptane and the solvent was subsequently removed. Chromium content of the solid: 1.9% by weight.
Variant B 60 g of calcined silica gel were mixed dry with 4 g (0.02 mol) of bis(cyclopentadienyl)chromium, the pressure in the reaction vessel was then reduced to 0.01 kPa and was maintained for two hours; during this time, the bis (cyclopentadienyl)chromium deposited on the silica gel. Chromium content of the solid: 1.9% by weight.
Variant C The procedure of Variant B was repeated, but the catalyst solid obtained was heated at 80° C. for 2.5 hours. Chromium content of the solid: 1.9% by weight.

Component IIb) (zirconium-containing)

1.19 g (0.0021 mol) of rac-dimethylsilanediylbis(2-methylbenzindenyl)zirconium dichloride were dissolved at room temperature in 538.5 ml of a 1.53 molar solution of methylaluminoxane in toluene (0.82 mol). 100 g of a silica gel SG 332 (25–40 μm) from Grace calcined at 800° C. in a stream of argon were slowly introduced into this solution and the solvent was subsequently evaporated.
Polymerizations Examples 2 and 3 (ethylene/1-hexene copolymerization)

The polymerizations were carried out in a 180 l Phillips suspension loop reactor using iso-butane as suspension medium. The catalyst components I) and IIa) (Example 1) were added from two different metering-in points. The catalyst component IIa) was prepared as described in Example 1, Variant B. The polymerization was carried out in the presence of n-butyllithium (0.063 molar in heptane) as component III) and using hydrogen as molar mass regulator. The reactor was initially charged with the monomers, cocatalyst and suspension medium and the polymerization was started by metering in the catalyst components I) and IIa) and was then conducted continuously. The polymer was subsequently granulated by means of an extruder. The process parameters are shown in Table 1, the product properties are shown in Table 2.

TABLE 1

| Process parameters | | |
| --- | --- | --- |
| Example | 2 | 3 |
| Hydrogen [% by vol.] | 0.31 | 0.57 |
| Ethylene [% by vol.] | 18.1 | 12.8 |
| 1-Hexene [% by vol.] | 2.0 | 1.3 |

TABLE 1-continued

| Process parameters | | |
| --- | --- | --- |
| Example | 2 | 3 |
| Reaction temp. [° C.] | 97.6 | 97.5 |
| n-Butyllithium [g/h] | 0.31 | 0.31 |
| Productivity [g/g]$^{a)}$ | 5600 | 5000 |

$^{a)}$g of polymer/g of catalyst solid

TABLE 2

| Polymer properties | | |
| --- | --- | --- |
| Example | 2 | 3 |
| Density [g/cm$^3$]$^{b)}$ | 0.9476 | 0.9467 |
| MFR [g/10 min]$^{c)}$ | 5.6 | 6.7 |
| ESCR [h]$^{d)}$ | >200 | >200 |

$^{b)}$determined in accordance with DIN 53479
$^{c)}$Melt flow rate at 190° C. and a load of 21.6 kg, determined in accordance with DIN 53735
$^{d)}$Environmental stress crack resistance, determined by BASF's own method. Here, the polymer is pressed to form a 1 mm thick plate from which disks having a diameter of 38 mm are stamped. These disks are provided on one side with a 200 μm deep, 3 cm long notch. The plates are dipped into a 5% strength surfactant solution (Lutensol ® FSA) which is at 50° C., and a pressure of 3 bar is applied on one side of the plates. The time from application of pressure to fracture of the disk is measured. The arithmetic mean of five measurements is calculated.

Comparative example

The ESCR of an ethylene/1-hexene copolymer (0.004 mol % of units derived from 1-hexene, d=0.9465 g/cm$^3$) obtained using a conventional Phillips catalyst as described in DE-A 25 40 279 (example) was measured. It was 118 hours.

The polymers of the present invention prepared as described in Examples 2 and 3 have a higher environmental stress crack resistance than the polymer of the comparative experiment while the density is at least as high.

Examples 4 and 5

General

A 1 l autoclave was charged with 500 ml of isobutane, 5 ml of 1-hexene (0.04 mol) and 20 mg of n-butyllithium (0.063 molar in heptane). The contents of the autoclave were heated to 80° C., the pressure was increased by means of ethylene to 4000 kPa and 40 mg of each of the catalyst solids I) and IIb) were metered in and the polymerization was carried out for 90 minutes.

Example 4

Here, the catalyst component I) was metered in first and the component IIb) (Example 1) was then metered in. 104 g of polymer were obtained, corresponding to a productivity of 1300 g of polymer/g of catalyst solid. The density of the polymer was 0.935 g/cm$^3$ and the MFR (190° C./21.6 kg) was 0.0 g/10 min.

Example 5

The procedure of Example 4 was repeated except that the component IIb) was metered in first followed by the component I). 123 g of polymer were obtained, corresponding to a productivity of 1540 g of polymer/g of catalyst solid. The density of the polymer was 0.9280 g/cm$^3$ and the MFR (190° C./21.6 kg) was 0.0 g/10 min.

We claim:

1. A polymer of ethylene obtained by polymerization of ethylene or ethylene and further comonomers in the presence of a catalyst system comprising as active constituents I) a Phillips catalyst, II) a solid which is different from I) and comprises a silica gel support and a component which is derived from the metallocene complexes of the formula (A) in which the substituents and the indices have the following meanings:

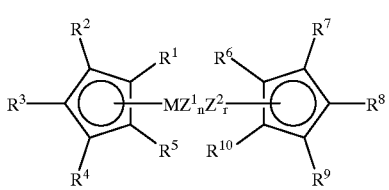

(A)

$R^1$ to $R^{10}$ are hydrogen, $C_1$–$C_{10}$-alkyl, 5- to 7-membered cycloalkyl which may in turn bear $C_1$–$C_6$-alkyl groups as substituents, $C_5$–$C_{15}$-aryl or arylalkyl, where two adjacent radicals may also together form a cyclic group having from 4 to 15 carbon atoms, or $Si(R^{11})_3$, where $R^{11}$ is $C_1$–$C_{10}$-alkyl, $C_6$–$C_{15}$-aryl or $C_3$–$C_{10}$-cycloalkyl, or the radicals $R^4$ and $R^9$ together form a group —[Y($R^{12}R^{13}$)$_m$]—, where
Y is silicon, germanium, tin or carbon
$R^{12}$, $R^{13}$ are hydrogen, $C_1$–$C_{10}$-alkyl, $C_3$–$C_{10}$-cycloalkyl or $C_6$–$C_{15}$-aryl M is a metal of transition groups IV to VIII or a metal of the lanthanide series, $Z^1$, $Z^2$ are fluorine, chlorine, bromine, iodine, hydrogen, $C_1$–$C_{20}$-alkyl or aryl, —$OR^{14}$, —$OOCR^{14}$,

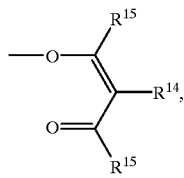

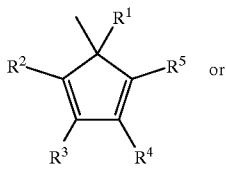

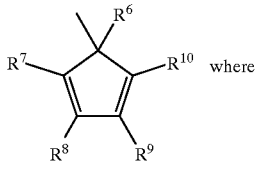 where $R^{14}$ is hydrogen or $C_1$–$C_{20}$-alkyl,
$R^{15}$ is $C_1$–$C_{20}$-alkyl,
m 1, 2, 3 or 4
n 0, 1 or 2
r 0, 1 or 2,
where the sum n+r is likewise 0, 1 or 2, and optionally III) an organometallic component selected from groups IA, IIA, IIB and IIIA of the Periodic Table of the Elements.

2. The polymer defined in claim 1, wherein M in (A) is zirconium or chromium.

3. The polymer defined in claim 1 which has a density in the range from 0.925 to 0.965 g/cm$^3$.

4. The polymer defined in claim 1 comprising $C_3$–$C_{15}$-alk-1-enes as comonomers.

5. A catalyst system comprising as active constituents

I) a Phillips catalyst,

II) a solid which is different from I) and comprises a silica gel support and a component which is derived from the metallocene complexes of the formula (A) in which the substituents and the indices have the following meanings:

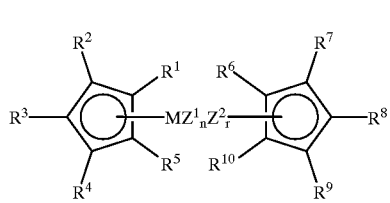

(A)

$R^1$ to $R^{10}$ are hydrogen, $C_1$–$C_{10}$-alkyl, 5- to 7-membered cycloalkyl which may in turn bear $C_1$–$C_6$-alkyl groups as substituents, $C_5$–$C_{15}$-aryl or arylalkyl, where two adjacent radicals may also together form a cyclic group having from 4 to 15 carbon atoms, or $Si(R^{11})_3$, where $R^{11}$ is $C_1$–$C_{10}$-alkyl, $C_6$–$C_{15}$-aryl or $C_3$–$C_{10}$-cycloalkyl, or the radicals $R^4$ and $R^9$ together form a group —[Y($R^{12}R^{13}$)$_m$]—, where
Y is silicon, germanium, tin or carbon
$R^{12}{}_1$ $R^{13}$ are hydrogen, $C_1$–$C_{10}$-alkyl, $C_3$–$C_{10}$-cycloalkyl or $C_6$–$C_{15}$-aryl M is a metal of transition groups IV to VIII or a metal of the lanthanide series, $Z^1$, $Z^2$ are fluorine, chlorine, bromine, iodine, hydrogen, $C_1$–$C_{20}$-alkyl or aryl, —$OR^{14}$, —$OOCR^{14}$,

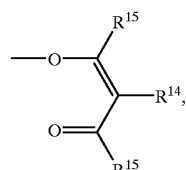

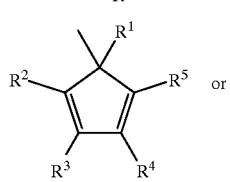 or

-continued

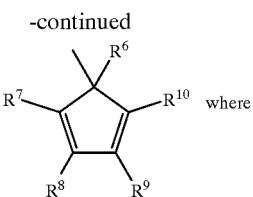 where $R^{14}$ is hydrogen or $C_1$–$C_{20}$-alkyl,
$R^{15}$ is $C_1$–$C_{20}$-alkyl,
m 1, 2, 3 or 4
n 0, 1 or 2
r 0, 1 or 2,
where the sum n+r is likewise 0, 1 or 2, and optionally III) an organometallic component selected from groups IA, IIA, IIB and IIIA of the Periodic Table of the Elements.

6. The catalyst system defined in claim 5, wherein M in (A) is zirconium or chromium.

7. The catalyst system defined in claim 5, wherein (A) is a zirconium complex containing a bridged, substituted or unsubstituted indenyl ligand.

8. A process for preparing polymers of ethylene or ethylene and further comonomers as defined in claim 1, which comprises polymerizing ethylene and optionally further comonomers in the presence of the catalyst system.

9. A process for producing films, moldings and fibers, comprising extruding a polymer as claimed in claim 1.

10. A film, molding or fiber comprising a polymer as claimed in of claim 1.

* * * * *

UNITED STATES PATENT AND TRADEMARK OFFICE
CERTIFICATE OF CORRECTION

PATENT NO.: 6,180,731

DATED: January 30, 2001

INVENTOR(S): ROHDE et al.

It is certified that error appears in the above-identified patent and that said Letters Patent is hereby corrected as shown below:

In the abstract, line 19 after formula (A), "$C_1$-$C_{10}$-alky, $C_3$-$C_{10}$-cycloalyl" should be --$C_1$-$C_{10}$-alkyl, $C_3$-$C_{10}$-cycloalkyl--.

In the abstract, fifth line from the bottom, "n is 0, or 2" should be --n is 0, 1 or 2--.

Col. 10, claim 5, line 45, "$R^{12}_1$ $R^{13}$" should be --$R^{12}$, $R^{13}$--.

Col. 12, claim 10, line 15, delete "of".

Signed and Sealed this

Twenty-ninth Day of May, 2001

NICHOLAS P. GODICI

*Attest:*

*Attesting Officer*     Acting Director of the United States Patent and Trademark Office